Aug. 23, 1932. J. A. VAN NESS 1,873,682
FISH LURE
Filed April 11, 1930
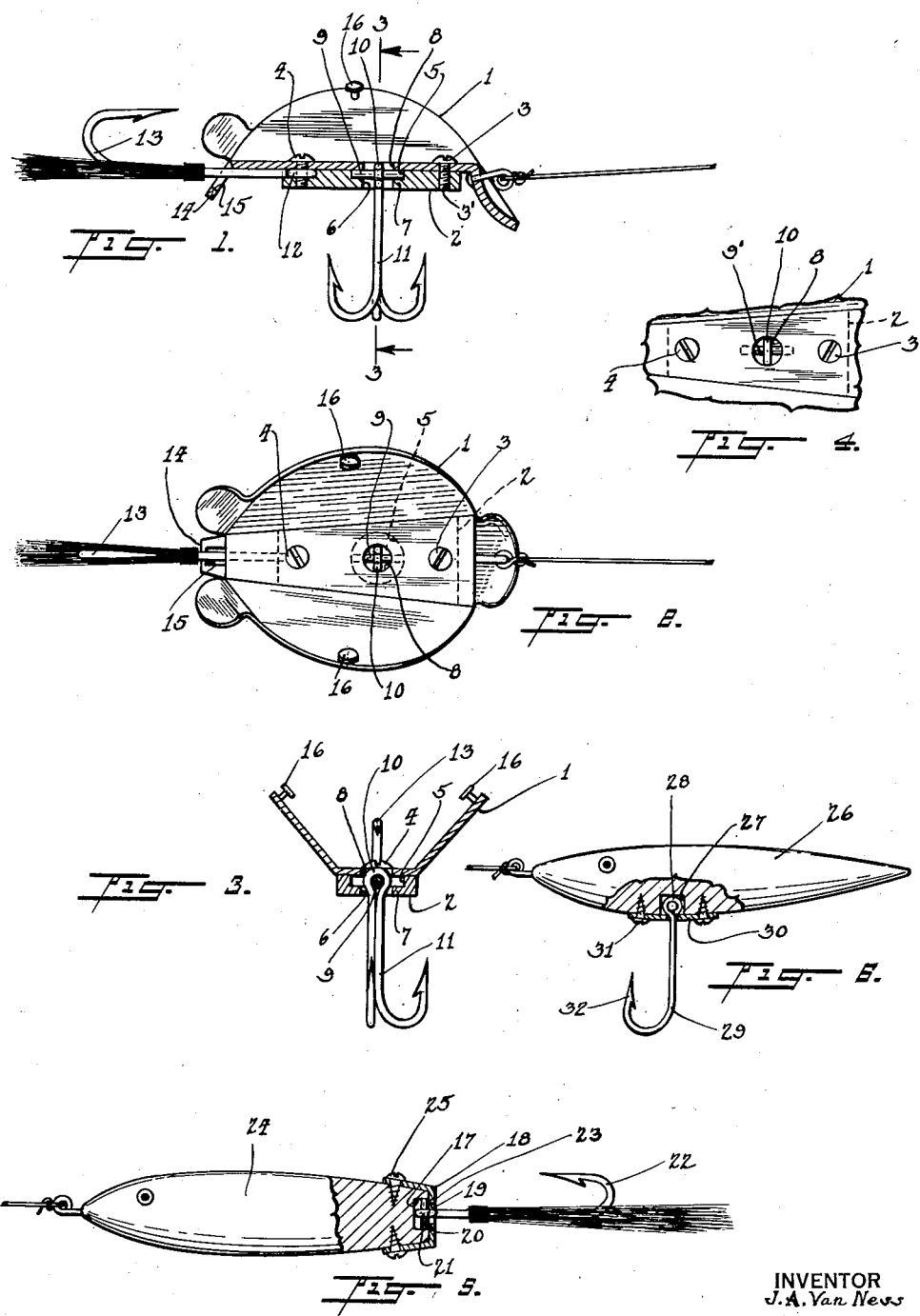
INVENTOR
J. A. Van Ness
BY
ATTORNEYS Patented Aug. 23, 1932

1,873,682

UNITED STATES PATENT OFFICE

JOHN A. VAN NESS, OF BLOOMINGTON, ILLINOIS

FISH LURE

Application filed April 11, 1930. Serial No. 443,459.

My invention relates to improvements in fish lures, and it consists in the combinations, constructions, and arrangements herein described and claimed.

An object of my invention is to provide a fish lure having a weight, the weight being provided with means for securing fishhooks to the lure.

A further object is to provide a fish lure having novel means for removably securing hooks thereto.

A further object is to provide a fish lure provided with means whereby a hook may be removably secured thereto without bending the eye of the hook.

A further object is to provide a fish lure having novel means whereby hooks of different sizes may be removably secured thereto.

A further object is to provide a fish lure having novel means whereby a hook may be pivotally and removably secured thereto without bending the eye of the hook.

Other objects and advantages will appear in the following specification, and the novel features of the invention will be particularly pointed out in the appended claims.

My invention is illustrated in the accompanying drawing, forming part of this application, in which Figure 1 is a sectional view of my device as applied to a fish lure, the hook being pivotally mounted, Figure 2 is a top plan view of the fish lure shown in Figure 1, Figure 3 is a sectional view taken along the line 3—3 of Figure 1, Figure 4 shows a portion of the lure shown in Figure 2, the hook being fixedly mounted, Figure 5 shows my device adapted for pivotally securing a hook to a fish lure without a weight, and Figure 6 is a modified form for pivotally securing a hook to a fish lure.

In carrying out my invention I provide a body portion 1 of a fish lure, which may be of any desired shape or material. Figures 1, 2, and 3 show the lure as being cut from sheet metal and bent in the shape of a fanciful bug. A weight member or plate 2 is disposed on the lower side of the body portion, and is secured thereto by any suitable means such as screws 3 and 4 which extend through the body portion and are receivable in threaded openings 3' in the weight member. The weight member or plate 2 is provided with an annular recess 5. An opening 6, concentric with the recess 5, extends from the base of the recess to the opposite side of the weight member 2. The opening 6 is of smaller diameter than the recess 5, and of equal or greater diameter than the diameter of an eye 10, thereby forming an annular flange 7 of the weight 2.

The body portion 1 is provided with an opening 8 of smaller diameter than the recess 5. A pin 9, of substantially the same length as the diameter of the recess, is rotatably disposed within the recess between the annular flange 7 of the plate 2 and the body portion 1. The pin 9 extends through the eye 10 of a fishhook 11, thereby pivotally securing the hook to the lure. The opening 8 in the body portion 1 permits the top edge of the eye to come substantially level with the top edge of the body portion. This eliminates the need of making a thick weight. It will also be seen that the body portion provides the cover means for retaining the pin within the recess.

A portion of the weight 2 is hollowed out concentric with the screw 4 for receiving the eye 12 of a hook 13. The screw 4 extends through the eye 12. Thus it will be seen that the screw 4 serves to secure both the hook and the weight member. The body portion 1 is provided with a bent portion 14. The bent portion 14 is provided with a slotted opening 15 for receiving the hook 13. The opening 15 is slotted in order that the eye 12 may be inserted therethrough for securing it by means of the screw 4.

It will readily be seen that when a great weight is placed on the hook 13, tending to bend it, the bent portion 14 acts as a means for supporting the hook so that all of the strain does not come on the eye portion 12. The body portion 1 may also be provided with projections 16 for attaching pork rind or other desired material to the body portion, but these projections form no part of my invention.

In Figure 1 the hook 11 is pivotally mounted by reason of the pin 9 being rotatably disposed in the annular recess 5. However, it will be seen that if the recess is slotted as shown in Figure 4, instead of annular, the pin will not be rotatably mounted therein and, therefore, the hook 11 will be only slightly pivotal, due to the difference of the diameters of the pin 9 and the eye 10.

In Figure 5 the wooden minnow or other fish lure 24 is provided with an annular recess 17. A cover plate 18 is provided with an opening 19 concentric with and of less diameter than the annular recess 17. The diameter of the opening 19 is equal to or greater than the outside diameter of an eye 21 of a fish lure 22. A pin 20 extends through the eye 21 and is rotatably mounted in the annular recess 17 and is secured in place by the annular flange 23 of the cover plate 18. The cover plate 18 is secured to the fish lure 24 by any suitable fastening means such as screws 25.

In Figure 6 I have shown a body portion or fish lure 26 provided with an annular recess 27 equal to or greater than the outside diameter of an eye 28 of a fishhook 29. A plate 30 is provided with an opening less than the outside diameter of the eye 27. The plate 30 is secured to the body portion 26 by any suitable means such as screws 31.

From the foregoing description of the various parts of the device, the operation thereof may be readily understood. In referring to Figure 1 let it be assumed that the weight member or plate 2 is detached from the body portion 1. Any suitable hook 11 is desired to be secured to the lure. The eye 10 is first inserted through the opening 6 from the lower side of the weight, as shown in Figure 1. The pin 9 is then inserted through the eye 10 and the eye is pulled back until the pin 9 rests within the annular recess 5. Any hook 13 may be selected, the eye 12 being inserted through the opening 15 of the bent portion 14 and is receivable in the cutaway portion of the weight member. The weight member is then secured to the body portion 1 by means of the screws 3 and 4. Thus it will be seen that the hook 11 is swivelly mounted by means of the pin 9. However, it may be desired not to have the hook swivelly mounted, in which case the weight is provided with a longitudinal groove for receiving the pin 9, as shown in Figure 4; consequently the hook will be in a more or less fixed position. From Figures 1 and 4 it will be readily seen that by having the diameter of the annular recess less than the slotted groove, the hook 11 may be either swivelly or fixedly secured to the lure by merely using two different pins 9 or 9', the pin 9 permitting the hook to swivel, and the pin 9' holding the hook in fixed position.

It will be seen in referring to Figure 1, that if it is desired to change the kind of hook, it will merely be necessary to loosen the screws 3 and 4, thereby detaching the weight 2 from the body portion 1. The pin 9 is then withdrawn from the eye 10 and the newly chosen hook is substituted in the manner hereinbefore described.

In referring to Figure 5 it will be seen that the same method is carried out for substituting another hook for the hook 22. In order to change the hook 29, shown in Figure 6, the plate 30 is removed from the lure 26, and the hook is removed from the plate by passing the hook portion 32 through the hole in the plate, as the hole is of less diameter than the outside diameter of the eye portion. Thus it will be readily understood from the preceding description, that a number of hooks of different kinds may be used with a single lure, the hooks being secured to or removed from the lure without necessitating the bending of the hook-eye, said hooks being quickly and easily interchangeable.

I claim:

1. In a fish lure, the combination of a body portion having a circular recess therein, a plate member having an opening therethrough of lesser diameter than the diameter of the recess, a hook member extending through said opening and provided with an eye portion rotatably disposed in the recess, and means for connecting said plate member with the body portion.

2. In a fish lure, the combination of a body portion having a circular recess therein, a plate member having an opening therethrough of lesser diameter than the diameter of the recess, a hook member extending through said opening and provided with an eye portion rotatably disposed in the recess, a pin rotatably disposed in said recess and extending through the eye portion of the hook member, said pin being of substantially the same length as the diameter of the recess, and means for connecting said plate member with the body portion.

3. A fish lure, comprising a body portion, a plate member connected with the body portion and provided with an opening therethrough, and a hook member extending through the opening and provided with an eye portion positioned between the plate member and the body portion, the opening in said plate member being of lesser diameter than the outside diameter of the eye member for rotatably connecting the hook member with the body portion.

4. A fish lure, comprising a body portion, a plate member connected with the body portion and provided with an opening therethrough, a hook member extending through the opening and provided with an eye portion positioned between the plate member and the body portion, and a retaining element extending through the eye portion and rotatable about its transverse axis for rotatably connecting the hook member with the body portion.

5. A fish lure, comprising a body portion, a plate member connected with the body portion and provided with an opening therethrough, said plate member being provided with an annular recess on the inner side thereof substantially in alignment with the opening and of greater diameter than said opening, a hook member extending through the opening and provided with an eye portion, and a retaining element disposed in the recess and extending through the eye portion of the hook member, said retaining element being rotatable about its transverse axis for rotatably connecting the hook member with the body portion.

Signed at Bloomington, in the county of McLean and State of Illinois this 8 day of April A. D. 1930.

JOHN A. VAN NESS.